United States Patent
Chen

(10) Patent No.: US 8,726,074 B2
(45) Date of Patent: May 13, 2014

(54) HANDLING DEVICE AND METHOD FOR VOLTAGE FAULTS

(75) Inventor: Chia-Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 241 days.

(21) Appl. No.: 13/348,185

(22) Filed: Jan. 11, 2012

(65) Prior Publication Data

US 2013/0132712 A1 May 23, 2013

(30) Foreign Application Priority Data

Nov. 18, 2011 (TW) .............................. 100142307 A

(51) Int. Cl.
*G06F 11/00* (2006.01)

(52) U.S. Cl.
USPC ........................................................... 714/14

(58) Field of Classification Search
None
See application file for complete search history.

(56) References Cited

U.S. PATENT DOCUMENTS

| | | | | |
|---|---|---|---|---|
| 4,951,171 A * | 8/1990 | Tran et al. | ......................... | 361/90 |
| 5,077,521 A * | 12/1991 | Langford et al. | ............... | 324/537 |
| 5,581,692 A * | 12/1996 | Nevitt et al. | ...................... | 714/12 |
| 6,003,140 A * | 12/1999 | Pientka et al. | ................... | 714/23 |
| 7,647,531 B2 * | 1/2010 | Upton et al. | ...................... | 714/44 |
| 7,844,846 B2 * | 11/2010 | Morrell | .......................... | 713/340 |
| 8,055,927 B2 * | 11/2011 | Morrell | .......................... | 713/340 |
| 2005/0021260 A1* | 1/2005 | Robertson et al. | ............... | 702/75 |
| 2007/0174698 A1* | 7/2007 | Bailey et al. | ..................... | 714/22 |

* cited by examiner

*Primary Examiner* — Nadeem Iqbal
(74) *Attorney, Agent, or Firm* — Morris Manning & Martin LLP; Tim Tingkang Xia, Esq.

(57) ABSTRACT

A handling device and method for voltage faults applicable for using in a computer system. The handling method includes acquiring a signal of voltage fault. According to the signal of voltage fault and by looking up at tables, an operating status of the computer system corresponding to the signal of voltage fault is acquired, and generating a control signal according to the operating status. Then, the computer system according to the control signal is restarted.

7 Claims, 3 Drawing Sheets

HANDLING DEVICE AND METHOD FOR VOLTAGE FAULTS

CROSS-REFERENCE TO RELATED APPLICATIONS

This non-provisional application claims priority under 35 U.S.C. §119(a) on Patent Application No(s). 100142307 filed in Taiwan, R.O.C. on Nov. 18, 2011, the entire contents of which are hereby incorporated by reference.

BACKGROUND

1. Technical Field

The present disclosure relates to a handling device and method for voltage faults and more particularly to a handling device and method for voltage faults of a computer system.

2. Related Art

In general, a computer system is allocated with a power supply unit for supplying an operating voltage required for the computer system to operate normally. Furthermore, usually the power supply unit is capable of providing two kind of power, i.e. an aux power and a main power, for the computer system in different operating stages. The aux power is a standby power used by the computer system under a standby mode, while the main power is a main voltage source used by the computer system under an actual operation. By having the two different types of voltage supply, unnecessary power consumption can be avoided under the standby mode of the computer system.

However, a voltage fault may occur when the computer system is in operation or under a standby mode. Currently available computer systems provide corresponding handling mechanisms by detecting a voltage status when there is a voltage fault. When a voltage fault is detected by the computer system, the most common handling mechanism for voltage faults is to have the computer system turned off directly, while restarting is used by some computer systems as the handling mechanism.

Nevertheless, for the aforementioned handling mechanism for voltage faults, when there is a voltage fault, there is no handling method for voltage faults provided corresponding to an operating status of the computer system. That means, regardless of the operating stages of the computer system, it is either restarted or turned off should a voltage fault occurs. Therefore, the handling method for voltage faults needs to be improved.

SUMMARY

A handling method for voltage faults of the disclosure is suitable for using in a computer system. The handling method includes following steps. Acquiring a signal of voltage fault. According to the signal of voltage fault and by looking up at tables, acquiring an operating status of the computer system corresponding to the signal of voltage fault, and generating a control signal according to the operating status. Restarting the computer system according to the control signal.

The disclosure further provides a handling device for voltage faults applicable for using in a computer system. The handling device comprises a detecting unit, a comparison unit and a control unit. The detecting unit is used for detecting if there is a fault with a voltage of the computer system in order to generate a signal of voltage fault. The comparison unit is coupled to the detecting unit for receiving the signal of voltage fault, and by looking up at tables, an operating status of the computer system corresponding to the signal of voltage fault is acquired, and a control signal is generated according to the operating status. The control unit is coupled to the comparison unit for receiving the control signal and controlling the restarting of the computer system according to the control signal.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
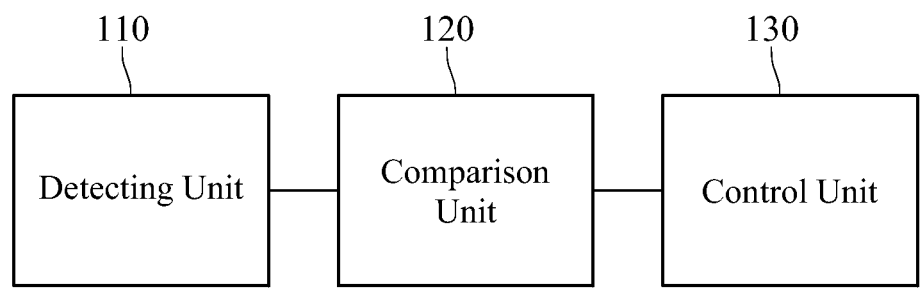
FIG. 1 is a block diagram of a handling device for voltage faults according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In view of the abovementioned problem, some embodiments of the disclosure provides a handling device and method for voltage faults in order to enhance a flexibility of handling voltage faults.

Referring to FIG. 1, which is a block diagram of a handling device for voltage faults of the disclosure. A handling device for voltage faults 100 of this embodiment is suitable for being used in a computer system. The handling device for voltage faults 100 comprises a detecting unit 110, a comparison unit 120 and a control unit 130.

The detecting unit 110 is used for detecting if there is a fault with the voltage used by the computer system in order to generate a signal of voltage fault. The comparison unit 120 is coupled to the detecting unit 110 for receiving the signal of voltage fault, and by looking up at tables, an operating status of the computer system corresponding to the signal of voltage fault is acquired, and a control signal is generated according to the operating status. In this embodiment, the operating status of the computer system includes the computer system before or after an idle mode, a status of a power supply unit, a type of voltage as well as the computer system under a stage of startup or a stage of runtime.

The control unit 130 is coupled to the comparison unit 120 for receiving the control signal and controlling the restarting of the computer system according to the control signal. The control signal includes a delay time and a number of times of restarting the computer system. In other words, according to an operating status of the computer system compared by the comparison unit 120 in which a voltage fault is occurred, the control unit 130 controls a delay time and a number of times of restarting the computer system correspondingly. Thereby, according to an operating status of the computer system in which a voltage fault is occurred, this embodiment can provide a corresponding control mechanism to control restarting of the computer system, so that a flexibility of handling voltage faults of a computer system can be enhanced effectively.

Because the effects on the computer system caused by various types of voltage are different, and a resistance of the computer system against voltage faults in each stage is different, when a voltage fault occurs, a handling mechanism can be set with different delayed restarting time according to different faults.

An example is set forth below for a clear description of an operating procedure of the handling device for voltage faults 100 of this embodiment.

Figure 2:
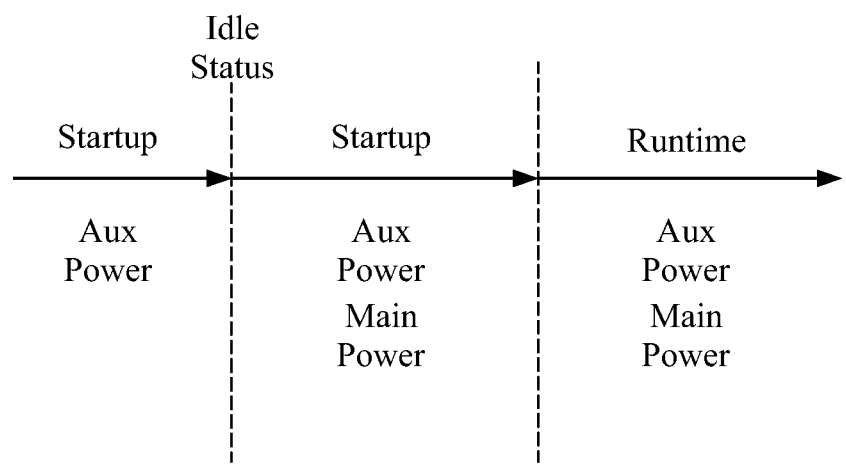
FIG. 2 is an illustration of corresponding relationships of an aux power and a main power in a stage of startup and a stage of runtime of a computer system before and after an idle status according to the disclosure.

Referring to FIG. 2, it is an illustration of corresponding relationships of an aux power and a main power in a stage of startup and a stage of runtime of a computer system before and after an idle status according to the disclosure. The left side of an idle status represents the computer system before the idle status, i.e. it is right after the computer system is connected to a power supply unit, and only an aux power is supplied by the power supply unit at this point. While the right side of the idle status represents the computer system after the idle status, i.e. the computer system leaves an idle mode and enters into a starting stage and an actual operating stage, the aux power and a main power are supplied by the power supply unit during a stage of startup and a stage of runtime respectively.

Assume an operating status of the computer system includes the computer system before or after an idle status, a status of a power supply unit, a type of voltage (e.g. if a voltage is an aux power or a main power) as well as the computer system under a stage of startup or a stage of runtime.

For example, the computer system after an idle status is represented by 0, the computer system before an idle status is represented by 1; power supply unit (PSU) fault is represented by 0, power supply unit (PSU) good, i.e. PSU functioning well, is represented by 1; an aux power is represented by 0, a main power is represented by 1; startup fault is represented by 0, runtime fault is represented by 1.

| | |
|---|---|
| After an idle status | 0 |
| Before an idle status | 1 |
| PSU Fault | 0 |
| PSU Good | 1 |
| Aux Power | 0 |
| Main Power | 1 |
| Startup Fault | 0 |
| Runtime Fault | 1 |

Table 1 is a Table of corresponding relationships of after an idle status, before an idle status, PSU fault, PSU good, aux power, main power, startup fault and runtime fault.

Table 2 is a Table of corresponding relationships of an idle status, a status of PSU, a type of voltage, a faulty stage, a result voltage fault, a delayed restarting time and a number of retried times of restarting.

| Idle Status | PSU Status | Type of Voltage | Faulty Stage | Result of Voltage Fault | Delayed Restarting Time | Number of Retried Times of Restarting |
|---|---|---|---|---|---|---|
| 0 | 0 | 0 | 0 | Computer system in startup stage after idle status, fault in aux power of PSU | T1 | C1 |
| 0 | 0 | 0 | 1 | Computer system in runtime stage after idle status, fault in aux power of PSU | T2 | C2 |
| 0 | 0 | 1 | 0 | Computer system in startup stage after idle status, fault in main power of PSU | T3 | C3 |
| 0 | 0 | 1 | 1 | Computer system in runtime stage after idle status, fault in main power of PSU | T4 | C4 |
| 0 | 1 | 0 | 0 | Computer system in startup stage after idle status, fault in aux power supplied by voltage regulating module or supplied to components | T5 | C5 |
| 0 | 1 | 0 | 1 | Computer system in runtime stage after idle status, fault in aux power supplied by voltage regulating module or supplied to components | T6 | C6 |
| 0 | 1 | 1 | 0 | Computer system in startup stage after idle status, fault in main power supplied by voltage regulating module or supplied to components | T7 | C7 |
| 0 | 1 | 1 | 1 | Computer system in runtime stage after idle status, fault in | T8 | C8 |

Table 2 is a Table of corresponding relationships of an idle status, a status of PSU, a type of voltage, a faulty stage, a result voltage fault, a delayed restarting time and a number of retried times of restarting.

| Idle Status | PSU Status | Type of Voltage | Faulty Stage | Result of Voltage Fault | Delayed Restarting Time | Number of Retried Times of Restarting |
|---|---|---|---|---|---|---|
| 1 | 0 | 0 | 0 | main power supplied by voltage regulating module or supplied to components Computer system in startup stage before idle status, fault in aux power of PSU | T9 | C9 |
| 1 | 1 | 0 | 0 | Computer system in startup stage before idle status, fault in aux power supplied by voltage regulating module | T10 | C10 |
| 1 | 1 | 1 | 1 | Power is operating normally | | |

In Table 2, "0000" represents that there is a fault in the aux power of the PSU while the computer system is in a startup stage after an idle status. T1 represents a delayed restarting time of the computer system, and C1 represents the number of times of restarting the computer system. "0001" represents that there is a fault in the aux power of the PSU while the computer system is in a runtime stage after an idle status. T2 represents a delayed restarting time of the computer system, and C2 represents the number of times of restarting the computer system. "0010" represents that there is a fault in the main power of the PSU while the computer system is in a startup stage after an idle status. T3 represents a delayed restarting time of the computer system, and C3 represents a number of times of restarting the computer system.

"0011" represents there is a fault in the main power of the PSU while the computer system is in a runtime stage after an idle status. T4 represents a delayed restarting time of the computer system, and C4 represents the number of times of restarting the computer system. "0100" represents there is a fault in the aux power supplied by a voltage regulating module or supplied to components while the computer system is in a startup stage after idle status. T5 represents a delayed restarting time of the computer system, and C5 represents a number of times of restarting the computer system. "0101" represents there is a fault in the aux power supplied by the voltage regulating module or supplied to the components while the computer system in a runtime stage after an idle status. T6 represents a delayed restarting time of the computer system, and C6 represents a number of times of restarting the computer system.

"0110" represents there is a fault in the main power supplied by the voltage regulating module or supplied to the components while the computer system in a startup stage after an idle status. T7 represents a delayed restarting time of the computer system, and C7 represents the number of times of restarting the computer system. "0111" represents there is a fault in the main power supplied by the voltage regulating module or supplied to the components while the computer system is in a runtime stage after an idle status. T8 represents a delayed restarting time of the computer system, and C8 represents the number of times of restarting the computer system. "1000" represents there is a fault in the aux power of the PSU, T9 represents a delayed restarting time of the computer system while the computer system is in a startup stage before an idle status. T9 represents a delayed restarting time of the computer system, and C9 represents a number of times of restarting the computer system.

"1100" represents there is a fault in the aux power supplied by the voltage regulating module while the computer system is in a startup stage before an idle status. T10 represents a delayed restarting time of the computer system, and C10 represents the number of times of restarting the computer system. "1111" represents the power is operating normally. The abovementioned Table 2 can be preset and stored in a memory of the comparison unit 120 by the user. Should a voltage fault occurs, an operating status of the computer system will be looked up at Table 2, and a control signal will be generated correspondingly so that an appropriate handling mechanism can be carried out.

Firstly, when a voltage fault of the computer system is detected by the detecting unit 110, a signal of voltage fault, such as "0101", is generated correspondingly. Then, an operating status of the computer system corresponding to the signal of voltage fault is located in Table 2 by the comparison unit 120 according to the signal of voltage fault "0101", wherein the operating status is the computer system in a runtime stage after an idle mode, and there is a fault in the aux power supplied by the voltage regulating module or supplied to the components. At this point, a corresponding control signal, such as a delayed restarting time of the computer system T6 and a number of times of restarting the computer system C6, is provided by the comparison unit 120 according to the aforementioned operating status. Then, the computer system is restarted by the control unit 130 according to the control signal (a delayed time T6 and a number of times C6).

For example, if there is a fault with a voltage supplied for the components, such as a central processing unit (CPU), in order to protect the important component, the number of times of restarting the computer system can only be set as one time, so as to prevent the component from being damaged due to too many times of restarting. Furthermore, in order to protect the data in the components, the delayed restarting time of the computer system is longer. However, if there is a fault with the voltage regulating module supplying a 6.5V voltage or the voltage regulating module supplying a 3.3V voltage, because resistances of affected devices against voltage faults are higher, thus the number of times of restarting the computer system can be set as two or more than two times. Thereby, the handling device for voltage faults 100 of this embodiment can enhance a flexibility of handling voltage faults of the computer system effectively.

Figure 3:
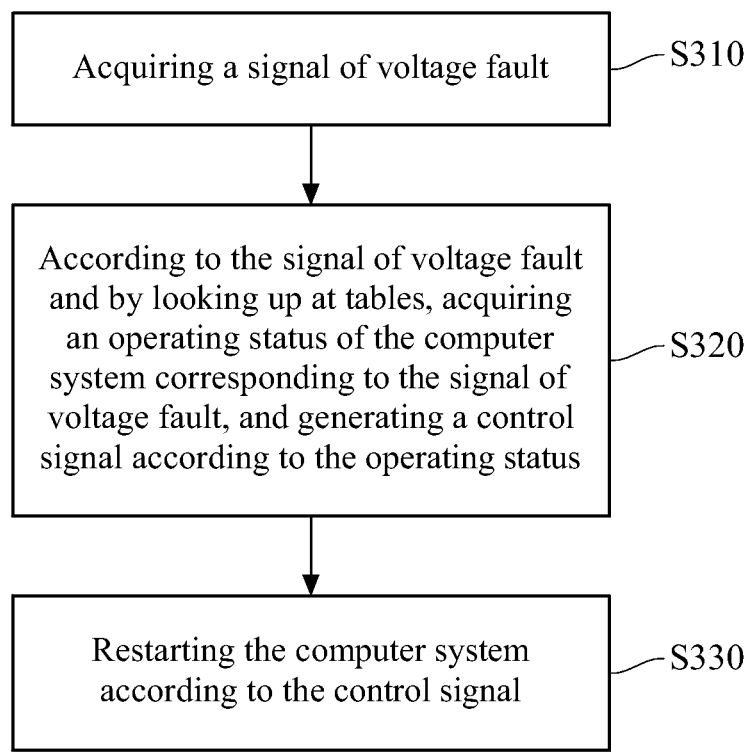
FIG. 3 is a flow chart of a handing method for voltage faults according to the disclosure.

According to the descriptions of the aforementioned embodiment, a handing method for voltage faults can be concluded. Refer to FIG. 3, it is a flow chart of a handing method for voltage faults of the disclosure. A handing method for voltage faults of this embodiment is applicable for using in a computer system. In step S310, a signal of voltage fault is acquired. In step S320, according to the signal of voltage fault and by looking up at tables, an operating status of the computer system corresponding to the signal of voltage fault is acquired, and a control signal is generated according to the operating status. In step S330, the computer system according to the control signal is restarted.

In this embodiment, the aforementioned operating status includes the computer system before or after an idle status, a status of a power supply unit, a type of voltage as well as the computer system under a stage of startup or a stage of runtime. The aforementioned control signal includes a delay time and a number of times of restarting the computer system.

Figure 4:
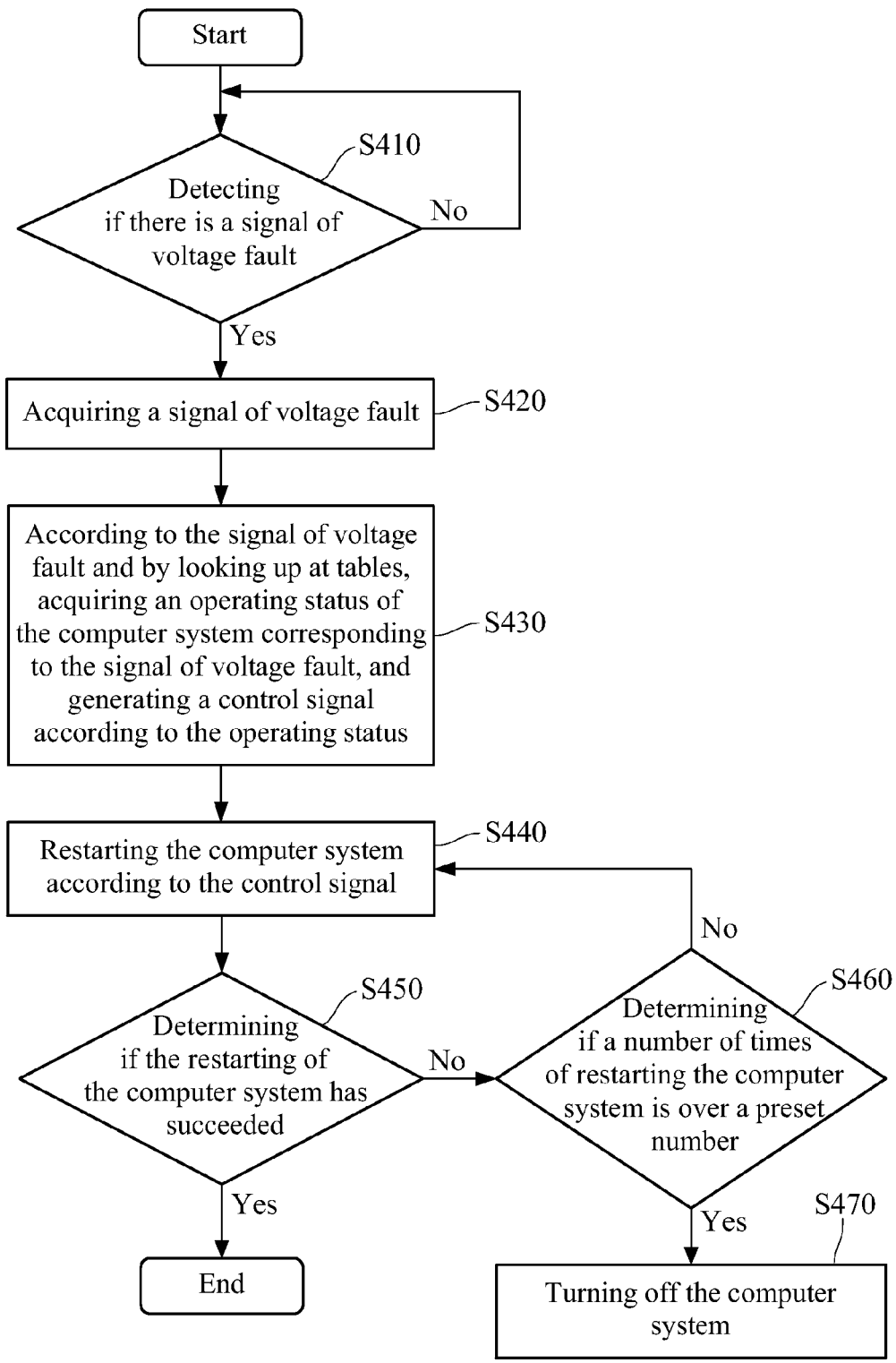
FIG. 4 is a flow chart of another handling method for voltage faults according to the disclosure.

Refer to FIG. 4, it is a flow chart of another handing method for voltage faults of the disclosure. A handing method for voltage faults of this embodiment is applicable for a computer system. In step S410, it is detected that if there is a signal of voltage fault. If no signal of voltage fault is detected, then continue the detecting step. If a signal of voltage fault is detected, proceed with step S420 of acquiring a signal of voltage fault. In step S430, according to the signal of voltage fault and by looking up at tables, an operating status of the computer system is acquired corresponding to the signal of voltage fault, and a control signal is generated according to the operating status. In step S440, the computer system according to the control signal is restarted. In step S450, it is determined that if the restarting of the computer system has succeeded.

If it is determined that the computer system is restarted successfully, then end this handling procedure for voltage faults. On the other hand, if it is determined that the restarting of the computer system is unsuccessful, then go to step S460, determining if a number of times of restarting the computer system is over a preset number. If it is determined that the number of times of restarting the computer system is over the preset number, then go to step S470, turning off the computer system. Furthermore, if it is determined that the number of times of restarting the computer system is not over the preset number, then go back to step S440, restarting the computer system again, and go to step S450, determining if the restarting of the computer system has succeeded. Then, steps S460 to S470 are proceeded, until the computer system is restarted successfully or until the computer system is turned off.

In this embodiment, the aforementioned operating status includes the computer system before or after an idle status, a status of a power supply unit, a type of voltage as well as the computer system under a stage of startup or a stage of runtime. The aforementioned control signal includes a delay time and a number of times of restarting the computer system.

According to a handling device and method for voltage faults of the embodiment of the disclosure, an operating status of the computer system corresponding to an acquired signal of voltage fault by looking up at tables is acquired, and a control signal (such as a delayed time and a number of times of restarting the computer system) is generated according to the operating status for controlling the restarting of the computer system. Thereby, different corresponding handling methods are provided by the disclosure according to different operating statuses of the computer system, so that a flexibility of handling voltage faults can be enhanced effectively.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A handling method for voltage faults applicable for using in a computer system, the handling method comprising:
    acquiring a signal of voltage fault;
    according to the signal of voltage fault and by looking up at tables, acquiring an operating status of the computer system corresponding to the signal of voltage fault, and generating a control signal according to the operating status;
    restarting the computer system according to the control signal;
    determining if a restarting of the computer system is successful;
    if the restarting of the computer system being determined to be unsuccessful, determining if a number of times of restarting the computer system being over a preset number;
    if determining that the number of times being over the preset number, then turning off the computer system; and
    if determining that the number of times not being over the preset number, then returning back to the step of determining if the restarting of the computer system is successful.

2. The handling method for voltage faults as claimed in claim 1, further comprising:
    detecting if the signal of voltage fault being present;
    if the signal of voltage fault not being detected, returning back to the step of detecting if the signal of voltage fault being present; and
    if the signal of voltage fault being detected, proceeding with the step of acquiring the signal of voltage fault.

3. The handling method for voltage faults as claimed in claim 1, wherein the operating status includes the computer system before or after an idle status, a status of a power supply unit, a type of voltage as well as the computer system under a stage of startup or a stage of runtime.

4. The handling method for voltage faults as claimed in claim 1, wherein the control signal includes a delay time and a number of times of restarting the computer system.

5. A handling device for voltage faults applicable for using in a computer system, the handling device comprising:
    a detecting unit used to detect if a fault occurred in a voltage of the computer system in order to generate a signal of voltage fault;
    a comparison unit coupled to the detecting unit to receive the signal of voltage fault, and by looking up at tables, an operating status of the computer system corresponding to the signal of voltage fault being acquired, and a control signal being generated according to the operating status; and
    a control unit coupled to the comparison unit to receive the control signal, to control a restarting of the computer system according to the control signal, and to determine if the restarting of the computer system has succeeded, if the restarting of the computer system is determined to be unsuccessful, the control unit determines if a number of times of restarting the computer system is over a preset number, if it is determined that the number of times is over the preset number, then the control unit controls the computer system to be turned off, if it is determined that the number of times is not over the preset number, the control unit determines if the restarting of the computer system has succeeded again, until the computer system is restarted successfully or until the computer system is turned off.

6. The handling device for voltage faults as claimed in claim 5, wherein the operating status includes the computer system before or after an idle status, a status of a power supply unit, a type of voltage as well as the computer system under a stage of startup or a stage of runtime.

7. The handling device for voltage faults as claimed in claim 5, wherein the control signal includes a delay time and a number of times of restarting the computer system.

\* \* \* \* \*